United States Patent
Kim et al.

(10) Patent No.: US 9,709,856 B2
(45) Date of Patent: Jul. 18, 2017

(54) DISPLAY DEVICE AND RELATED MANUFACTURING METHOD

(71) Applicant: Samsung Display Co., Ltd., Yongin-Si, Gyeonggi-Do (KR)

(72) Inventors: Han Su Kim, Seoul (KR); Se Hee Han, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/885,258

(22) Filed: Oct. 16, 2015

(65) Prior Publication Data
US 2016/0231608 A1    Aug. 11, 2016

(30) Foreign Application Priority Data
Feb. 9, 2015    (KR) .......................... 10-2015-0019567

(51) Int. Cl.
*G02F 1/1333* (2006.01)
*G02F 1/1341* (2006.01)
*G02F 1/1337* (2006.01)

(52) U.S. Cl.
CPC .......... *G02F 1/1341* (2013.01); *G02F 1/1337* (2013.01); *G02F 1/133377* (2013.01)

(58) Field of Classification Search
CPC ... G02F 1/1341; G02F 1/13377; G02F 1/1337
See application file for complete search history.

(56) References Cited

U.S. PATENT DOCUMENTS

2012/0062448 A1*  3/2012  Kim .................. G02F 1/133377
                                                    345/55
2015/0092130 A1   4/2015  Lee et al.

FOREIGN PATENT DOCUMENTS

KR    10-2014-0090851    7/2014
KR    10-2014-0095120    8/2014

* cited by examiner

*Primary Examiner* — James Dudek
(74) *Attorney, Agent, or Firm* — Innovation Counsel LLP

(57) ABSTRACT

A display device may include a substrate, a common electrode, a first subpixel electrode, a second subpixel electrode, a first liquid crystal layer, a second liquid crystal layer, and a wall member. The common electrode overlaps the substrate. The first subpixel electrode and the second subpixel electrode are positioned between the substrate and the common electrode and are insulated from each other. The first liquid crystal layer is positioned between the first subpixel electrode and the common electrode. The second liquid crystal layer is positioned between the second subpixel electrode and the common electrode. The wall member is formed of an organic material, is positioned between the first liquid crystal layer and the second liquid crystal layer, partially overlaps the first subpixel electrode, and is as wide as or wider than the first subpixel electrode in a plan view of the display device.

20 Claims, 11 Drawing Sheets

DISPLAY DEVICE AND RELATED MANUFACTURING METHOD

CROSS-REFERENCE TO RELATED APPLICATION

This application claims priority to and the benefit of Korean Patent Application No. 10-2015-0019567 filed in the Korean Intellectual Property Office on Feb. 9, 2015; the entire contents of the Korean Patent Application are incorporated herein by reference.

BACKGROUND (a) Field

The technical field is related to a display device and a method for manufacturing the display device.

(b) Description of Related Art

Display devices may be used in electronic devices, such as computer monitors, televisions, mobile phones, etc. Display devices may include cathode ray tube (CRT) display devices, liquid crystal display (LCD) devices, plasma display panel (PDP) devices, etc.

As an example, a liquid crystal display (LCD) device may include two panels with field generating electrodes, such as a pixel electrode and a common electrode, and may include a liquid crystal layer interposed between the two panels. The LCD device may display an image by generating an electric field to control alignment directions of liquid crystal molecules of the liquid crystal layer for controlling transmission of light. The display device may include a first substrate for supporting the pixel electrodes and may include a second substrate for supporting the common electrode. These two substrates may undesirably add to weight, thickness, cost, and/or manufacturing time associated with the display device.

The above information disclosed in this Background section is for enhancement of understanding of a background related to the invention. The Background section may contain information that does not form the prior art that is already known in this country to a person of ordinary skill in the art.

SUMMARY

An embodiment may be related to a display device. The display device may include a substrate, a common electrode, a first subpixel electrode, a second subpixel electrode, a first liquid crystal layer, a second liquid crystal layer, and a wall member. The common electrode may overlap the substrate. The first subpixel electrode may be positioned between the substrate and the common electrode. The second subpixel electrode may be insulated from the first subpixel electrode and may be positioned between the substrate and the common electrode. The first liquid crystal layer may be positioned between the first subpixel electrode and the common electrode. The second liquid crystal layer may be positioned between the second subpixel electrode and the common electrode. The wall member may be formed of an organic material, may be positioned between the first liquid crystal layer and the second liquid crystal layer, may partially overlap the first subpixel electrode, and may be as wide as or wider than the first subpixel electrode in a plan view of the display device.

The display device may include an overcoat. The common electrode may be positioned between the substrate and the overcoat. The wall member may be positioned between the first liquid crystal layer and a first portion of the overcoat. The first portion of the overcoat may be positioned between the wall member and a second portion of the overcoat. The second portion of the overcoat may directly contact the second liquid crystal layer and may be positioned between the second liquid crystal layer and the first portion of the overcoat.

The display device may include a roof layer. The first liquid crystal layer may be positioned between the first subpixel electrode and a first portion of the roof layer. The wall member may be positioned between the first subpixel electrode and a second portion of the roof layer and may be directly connected to the second portion of the roof layer. The first portion of the roof layer may be spaced from the second portion of the roof layer.

A first portion of the wall member may be positioned between the first subpixel electrode and a second portion of the wall member, may be connected through the second portion of the wall member to the second portion of roof layer, and may be wider than the second portion of the wall member.

The display device may include an overcoat, which may directly contact the second liquid crystal layer. The hole may be positioned between a portion of the overcoat and the first portion of the wall member.

A hole may be positioned between the first portion of the roof layer and the second portion of the roof layer.

The display device may include an overcoat, which may directly contact the second liquid crystal layer. The hole may be positioned between a portion of the overcoat and a portion of the common electrode.

The display device may include an insulating layer. The first liquid crystal layer may be positioned between the first subpixel electrode and a first portion of the insulating layer. The wall member may directly contact a second portion of the insulating layer. The first portion of the insulating layer may be spaced from the second portion of the insulating layer.

The display device may include an overcoat, which may directly contact the second liquid crystal layer. A hole may be positioned between a portion of the overcoat and the second portion of the insulating layer.

The display device may include an overcoat, which may directly contact the second liquid crystal layer. The display device may include an insulating layer, which may directly contact the overcoat. The first liquid crystal layer may be positioned between the first subpixel electrode and a first portion of the insulating layer. The wall member may be positioned between the first subpixel electrode and a second portion of the insulating layer. The first portion of the insulating layer may be spaced from the second portion of the insulating layer.

The first liquid crystal layer may be positioned between the first subpixel electrode and a first portion of the common electrode. A second portion of the common electrode may be positioned the first liquid crystal layer and the wall member. The first portion of the common electrode may be spaced from the second portion of the common electrode.

The display device may include an overcoat, which may directly contact the second liquid crystal layer. A hole may be positioned between a portion of the overcoat and the second portion of the common electrode.

The display device may include an alignment layer, which may directly contact the common electrode. The display device may include an overcoat, which may directly contact the second liquid crystal layer. The wall member may be positioned between a first portion of the alignment layer and a second portion of the alignment layer. The second portion of the alignment layer may be positioned between the wall member and a portion of the overcoat. A liquid crystal material portion may be positioned between the substrate and the second portion of the alignment layer.

The display device may include an overcoat, which may directly contact the second liquid crystal layer. A liquid crystal material portion may be positioned between the wall member and a portion of the overcoat.

A portion of the common electrode may be positioned between the wall member and the first subpixel electrode in a direction perpendicular to the substrate.

An embodiment may be related to a display device. The display device may include the following elements: a substrate; a roof layer, which may be formed of an organic material; a common electrode, which may be positioned between the substrate and the roof layer; a first subpixel electrode, which may be positioned between the substrate and the common electrode; and a first liquid crystal layer, which may be positioned between the first subpixel electrode and a first portion of the roof layer. A second portion of roof layer may be spaced from the first portion of the roof layer. The second portion of the roof layer may overlap the first subpixel electrode without overlapping the first liquid crystal layer in a direction perpendicular to the substrate.

A hole may be positioned between the first portion of the roof layer and the second portion of the roof layer.

The display device may include a wall member, which may be formed of the organic material and may be directly connected to the second portion of the roof member. The display device may include an overcoat, which may overlap the roof layer. The hole may be positioned between a first portion of the overcoat and a portion of the wall member. The portion of the wall member may be positioned between a second portion of the overcoat and the first liquid crystal layer.

An embodiment may be related to method for manufacturing a display device. The method may include the following steps: providing a substrate; providing a roof layer, which may be formed of an organic material; providing a common electrode, which may be positioned between the substrate and the roof layer; providing a first subpixel electrode, which may be positioned between the substrate and the common electrode; and providing a first liquid crystal layer, which may be positioned between the first subpixel electrode and a first portion of the roof layer. A second portion of roof layer may be spaced from the first portion of the roof layer. The second portion of the roof layer may overlap the first subpixel electrode without overlapping the first liquid crystal layer in a direction perpendicular to the substrate.

The method may include providing a wall member, which may be formed of the organic material and may be directly connected to the second portion of the roof member. A hole may be positioned between a portion of the common electrode and a portion of the wall member in a direction parallel to the substrate.

An embodiment may be related to a display device. The display device may include the following elements: a thin film transistor formed on a substrate; a pixel electrode connected to the thin film transistor; a microcavity formed on the pixel electrode; a liquid crystal layer filling the microcavity; a roof layer spaced from the pixel electrode by the microcavity and providing lateral walls of the microcavity; an injection hole formed at one side of the microcavity; a wall member formed at the other side of the microcavity; and a hole formed at the roof layer adjacent to the wall member.

The microcavities may be formed in a matrix form that includes a plurality of columns and a plurality of rows. A first valley formed in a row direction between the adjacent microcavities and a second valley formed in a column between the adjacent microcavities may be further included in the display device.

The wall member may be formed at one side of the first valley to close one side of the microcavity, and the injection hole may be formed at the other side of the first valley to open the other side of the microcavity.

A hole may be formed at each microcavity.

The hole may be continuously formed in a linear shape along the wall member while being adjacent to the wall member.

The wall member may include a step member. The hole may extend over the step member of the wall member.

An alignment layer formed at an entire inner surface of the microcavity may be further included in the display device, and a portion of the alignment layer may be lumped in the hole.

The wall member may be made of the same material as the roof layer.

The display device may further include a common electrode formed below the roof layer to be spaced apart from the pixel electrode by the microcavity, and an overcoat formed on the roof layer to cover the injection hole to seal the microcavity. An embodiment may be related to a manufacturing method of a display device.

The method may include the following steps: forming a thin film transistor; forming a pixel electrode connected to the thin film transistor; forming a sacrificial layer on the pixel electrode; forming an opening by removing a portion of the sacrificial layer; forming a roof layer on the sacrificial layer; forming a wall member in the opening; forming an injection hole by patterning the roof layer for a portion of the sacrificial layer to be exposed; forming a microcavity between the pixel electrode and the roof layer by removing the sacrificial layer; forming a hole by making a hole at the roof layer adjacent to the wall member; forming an alignment layer and a liquid crystal layer in the microcavity by injecting an aligning agent and a liquid crystal material into the microcavity through the injection hole; and sealing the microcavity by forming an overcoat on the roof layer, wherein the wall member is formed at one side of the microcavity, and the injection hole is formed at the other side of the microcavity.

The hole may be formed after the microcavity.

According to embodiments, a display device may include only one substrate. Advantageously, weight, thickness, cost, and/or manufacturing time associated with the display device may be minimized.

According to embodiments, a wall member and/or a hole may enable optimal formation of an alignment layer in a display device. Therefore, alignment of liquid crystal molecules in the display device may be optimized, and an aperture ratio of the display device may be optimized. Advantageously, images displayed by the display device may be satisfactory.

DETAILED DESCRIPTION OF EMBODIMENTS

Figure 1:
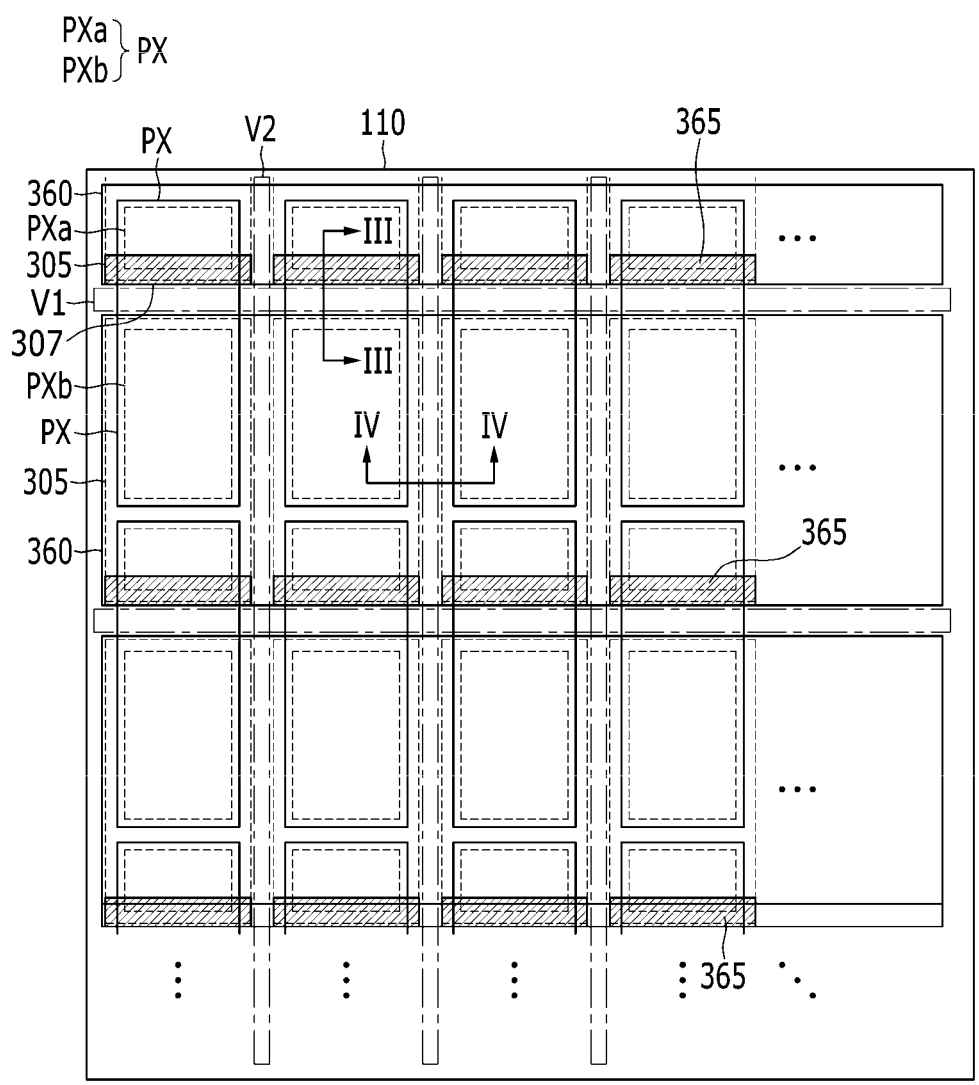
FIG. 1 is a schematic plan view illustrating elements and/or structures in a display device according to an embodiment.

Some embodiments are described with reference to the accompanying drawings. As those skilled in the art would realize, the described embodiments may be modified in various ways.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively. In the drawings, thicknesses of layers, films, panels, regions, etc., may be exaggerated for clarity. Like reference numerals may designate like elements. When a first element (such as a layer, film, region, or substrate) is referred to as being "on" a second element, the first element can be directly on the second element, or one or more intervening elements may also be present. When a first element is referred to as being "directly on" a second element, there are no intended intervening elements provided between the first element and the second element.

The term "connect" may mean "electrically connect". The term "insulate" may mean "electrically insulate". The phrase "formed on" may mean "formed, provided, and/or positioned on".

A drawing and related description may use a particular position and/or orientation of a device as an example. The device may have various positions and/or orientations.

FIG. 1 is a schematic plan view illustrating elements and/or structures in a display device according to an embodiment.

Referring to FIG. 1, the display device includes a substrate 110 made of a material such as glass or plastic, and a roof layer 360 formed on the substrate 110.

The substrate 110 includes a plurality of pixels PX. In the specification, the term "pixel(s) PX" may include or designate "pixel area(s)."

The pixels PX are disposed in a matrix form that includes a plurality of pixel rows and a plurality of pixel columns. Each pixel PX may include a first subpixel PXa and a second subpixel PXb. The first subpixel PXa and the second subpixel PXb may be aligned with each other in a pixel column direction.

A first valley V1 is disposed between the first subpixel PXa and the second subpixel PXb in a pixel row direction, and a second valley V2 is disposed between pixel columns.

The roof layer 360 may be formed in the plurality of pixel rows. In an embodiment, the roof layer 360 is removed at the first valley V1 and thus an injection hole 307 is formed so that constituent elements disposed below the roof layer 360 may be exposed to the outside.

Each roof layer 360 is formed to be separated from the substrate 110 between adjacent second valleys V2, such that a microcavity 305 is formed. Further, each roof layer 360 is formed to be attached to the substrate 110 in the second valley V2 such that it covers opposite lateral surfaces of the microcavity 305.

In other words, the roof layer 360 is formed to be attached to the substrate 110 in the second valley V2 to form opposite lateral walls of the microcavity 305.

The injection hole 307 of the microcavity 305 is formed in one of the remaining sides except for the opposite lateral walls of the microcavity 305, and a wall member 365 is formed in the other of the remaining sides, such that the microcavity 305 is closed. A plurality of microcavities 305 is disposed in a matrix form (or array) that includes a plurality of columns and a plurality of rows. For example, the microcavities 305 may have a quadrangular shape, and a lower edge of the microcavity 305 in a first row and an upper edge of the microcavity 305 in a second row face each other. In an embodiment, the wall members 365 are formed at the lower edge of the microcavity 305 in the first row or the upper edge of the microcavity 305 in the second row, and an injection hole 307 is formed at an edge of the microcavity 305 at which the wall member 365 is not formed.

The injection hole 307 is formed at one of two microcavities 305 facing each other and separated by one first valley V1, and the wall member 365 is formed at the other of two microcavities 305. In other words, the injection hole 307 is formed at one side of one microcavity 305 and the wall member 365 is formed at the other, such that the microcavity 305 may be closed, and thus only one injection hole 305 for a liquid crystal material or an aligning agent is formed.

The wall member 365 may be made of the same material as the roof layer 360, and may be formed at the most lower or upper end of each of the roof layers 360 in a pixel row direction. In an embodiment, the injection hole 307 may be formed at an opposite side of the most lower or upper end of the roof layer 360 at which the wall member 365 is formed.

A hole 363 may be further formed in the roof layer 360 adjacent to the wall member 365. A hole 363 may be formed at each microcavity 305, or may have a thin linear shape such that the roof layer 360 adjacent to the wall member 365 is opened. The wall member 365 may prevent an aligning agent or a liquid crystal aligning agent from extremely flowing into the microcavity when the aligning agent or the liquid crystal is injected, and the hole 363 may prevent occurrence of bubbles inside the microcavity 305 when the aligning agent or the liquid crystal is injected, such that alignment quality of the liquid crystal may be improved.

The aforementioned structure of the display device according to an embodiment is merely an example, and it may be variously modified. For example, a structure in which the pixel PX, the first valley V1, and the second valley V2 are disposed may be various, a plurality of roof layers 360 may be connected to each other in the first valley V1, and a portion of respective roof layers 360 may be formed to be spaced apart from the substrate 110 in the second valley V2 such that the adjacent microcavities 305 may be connected to each other.

In addition, the case where one microcavity 305 is formed throughout the first subpixel PXa and the second subpixel PXb of two adjacent pixels PX is described above, but the present invention is not limited thereto. For example, one microcavity 305 may be formed in one pixel PX.

Figure 2:
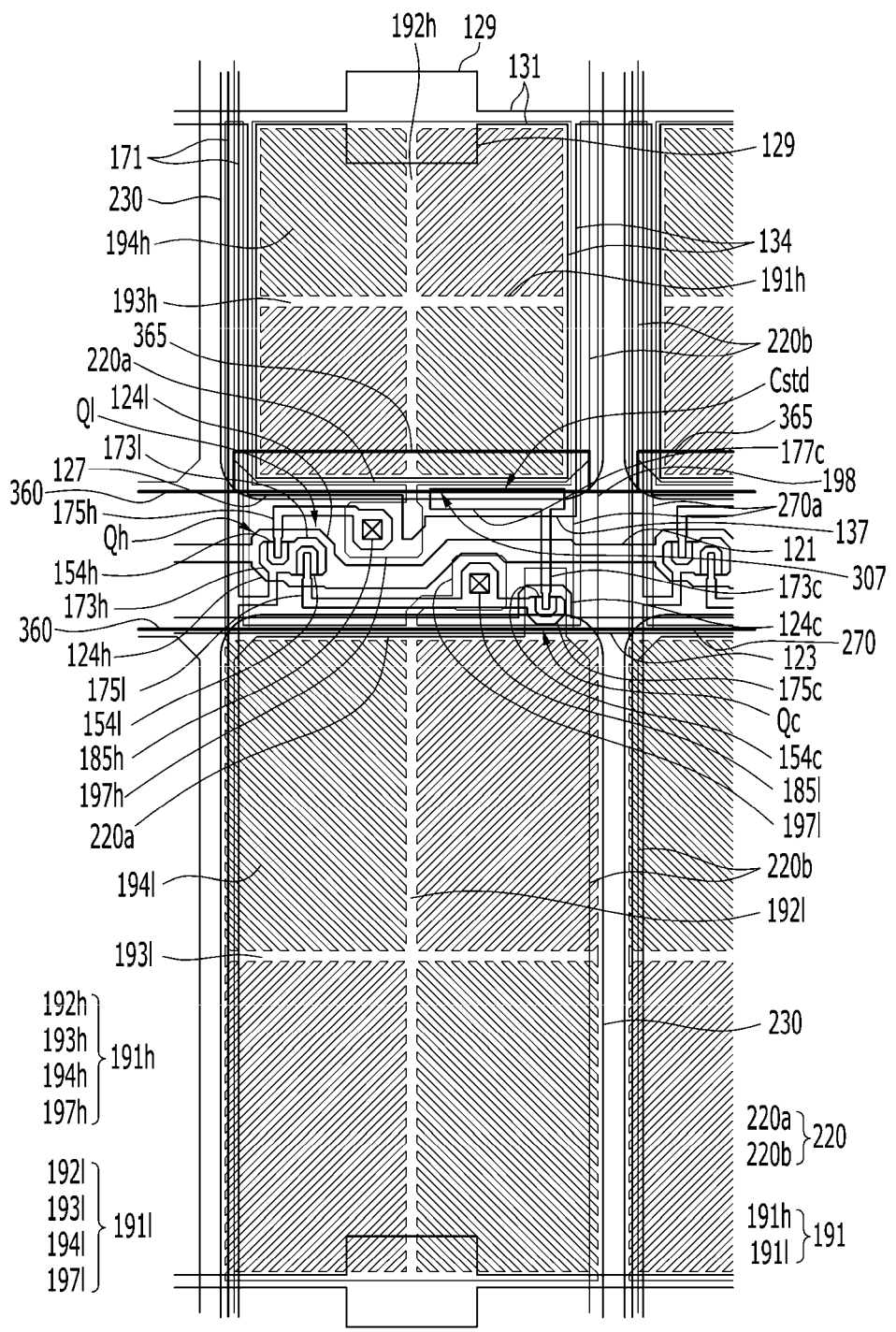
FIG. 2 is a schematic plan view illustrating elements and/or structures in a pixel of a display device according to an embodiment.
Figure 3:
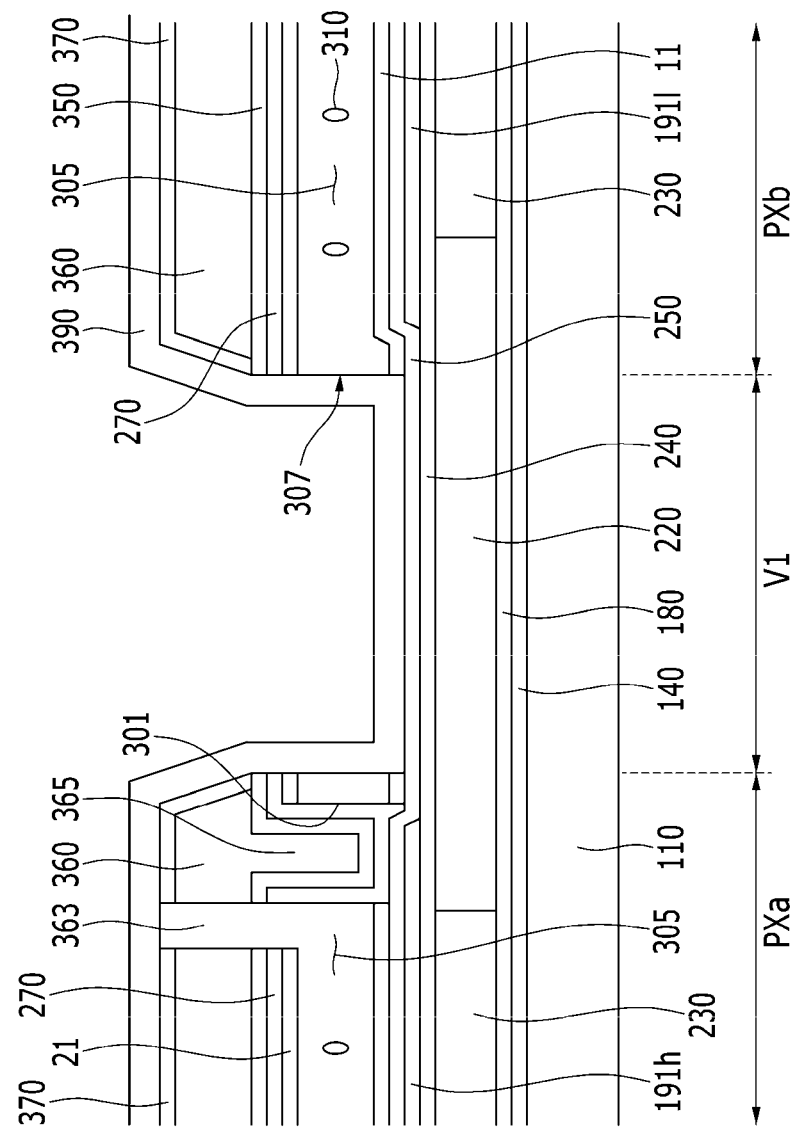
FIG. 3 is a schematic cross-sectional view taken along line III-III indicated in FIG. 1 according to an embodiment.
Figure 4:
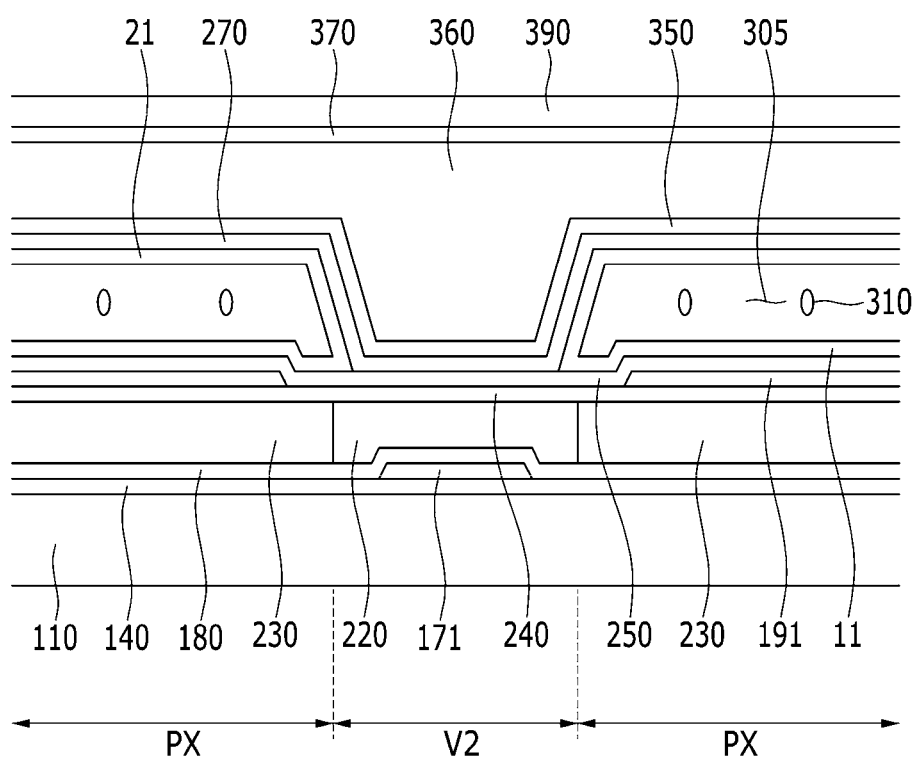
FIG. 4 is a schematic cross-sectional view taken along line IV-IV indicated in FIG. 1 according to an embodiment.

FIG. 2 is a schematic plan view illustrating elements and/or structures in a pixel of the display device according to an embodiment. FIG. 3 is a schematic cross-sectional view taken along line III-III indicated in FIG. 1 according to an embodiment. FIG. 4 is a cross-sectional view taken along line IV-IV indicated in FIG. 1 according to an embodiment.

Referring to FIGS. 2 to 4, a plurality of gate conductors including a plurality of gate lines 121, a plurality of step-down gate lines 123, and a plurality of storage electrode lines 131 are formed on an insulation substrate 110.

The gate line 121 and the step-down gate line 123 mainly extend in a horizontal direction to transmit gate signals. The gate conductor further includes a first gate electrode 124$h$ and a second gate electrode 124$l$ protruding upward and downward from the gate line 121, and further includes a third gate electrode 124$c$ protruding upward from the step-down gate line 123. The first gate electrode 124$h$ and the second gate electrode 124$l$ are connected with each other to form one protrusion. In an embodiment, respective protruded shapes of the gate electrodes 124$h$, 124$l$, and 124$c$ may be modified.

The storage electrode line 131 mainly extends in a horizontal direction and transmits a predetermined voltage such as a common voltage. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134. The horizontal portion 127 includes a capacitive electrode 137 extended downward. A gate insulating layer 140 is formed on the gate conductors 121, 123, 124$h$, 124$l$, 124$c$, 131. The gate insulating layer 140 may be made of an inorganic insulating material such as a silicon nitride (SiNx) and a silicon oxide (SiOx). Further, the gate insulating layer 140 may be formed as a single layer or multilayers.

A first semiconductor 154$h$, a second semiconductor 154$l$, and a third semiconductor 154$c$ are formed on the gate insulating layer 140. In the specification, the term "semiconductor" may include or designate "semiconductor layer."

The first semiconductor 154$h$ may be disposed on the first gate electrode 124$h$, the second semiconductor 154$l$ may be disposed on the second gate electrode 124$l$, and the third semiconductor 154$c$ may be disposed on the third gate electrode 124$c$. The first semiconductor 154$h$ and the second semiconductor 154$l$ may be connected to each other, and the second semiconductor 154$l$ and the third semiconductor 154$c$ may be connected to each other. Further, the first semiconductor 154$h$ may be formed to be extended to the lower portion of the data line 171. The first, second, and third semiconductors 154$h$, 154$l$, and 154$c$ may be made of amorphous silicon, polycrystalline silicon, a metal oxide, and the like.

Ohmic contacts (not illustrated) may be further disposed on the first, second, and third semiconductors 154$h$, 154$l$, and 154$c$, respectively. The ohmic contact may be made of a silicide or a material such as n+ hydrogenated amorphous silicon in which an n-type impurity is doped at a high concentration.

A data conductor including a data line 171, a first source electrode 173$h$, a second source electrode 173$l$, a third source electrode 173$c$, a first drain electrode 175$h$, a second drain electrode 175$l$, and a third drain electrode 175$c$ is disposed on the semiconductors 154$h$, 154$l$, and 154$c$.

The data line 171 transmits a data signal and mainly extends in a vertical direction to cross the gate line 121 and the step-down gate line 123. Each data line 171 extends toward the first gate electrode 124$h$ and the second gate electrode 124$l$, and includes the first source electrode 173$h$ and the second source electrode 173$l$ which are connected with each other.

Each of the first drain electrode 175$h$, the second drain electrode 175I, and the third drain electrode 175$c$ includes one wide end portion and the other rod-shaped end portion. The rod-shaped end portions of the first drain electrode 175$h$ and the second drain electrode 175$l$ are partially surrounded by the first source electrode 173$h$ and the second source electrode 173$l$, respectively. One wide end portion of the second drain electrode 175$l$ is further extended to form the third source electrode 173$c$ that is bent in a 'U'-letter shape. A wide end portion 177$c$ of the third drain electrode 175$c$ overlaps the capacitive electrode 137 to form a step-down capacitor Cstd, and the rod-shaped end portion is partially surrounded by the third source electrode 173$c$.

The first gate electrode 124$h$, the first source electrode 173$h$, and the first drain electrode 175$h$ form a first thin film transistor Qh together with the first semiconductor 154$h$, the second gate electrode 124I, the second source electrode 173I, and the second drain electrode 175I form a second thin film transistor Ql together with the second semiconductor 154I, and the third gate electrode 124$c$, the third source electrode 173$c$, and the third drain electrode 175$c$ form the third thin film transistor Qc together with the third semiconductor 154$c$.

The first semiconductor 154$h$, the second semiconductor 154I, and the third semiconductor 154$c$ are connected to each other to form a linear shape, and may have substantially the same planar shape as the data conductors 171, 173$h$, 173I, 173$c$, 175$h$, 175I, and 175$c$ and the ohmic contacts, except at channel regions between the source electrodes 173$h$, 173I, and 173$c$ and the drain electrodes 175$h$, 173I, and 175$c$.

In the first semiconductor 154$h$, an exposed portion which is not covered by the first source electrode 173$h$ and the first drain electrode 175$h$ is disposed between the first source electrode 173$h$ and the first drain electrode 175$h$. In the second semiconductor 154I, an exposed portion which is not covered by the second source electrode 173I and the second drain electrode 175I is disposed between the second source electrode 173I and the second drain electrode 175I. In addition, in the third semiconductor 154$c$, an exposed portion which is not covered by the third source electrode 173$c$ and the third drain electrode 175$c$ is disposed between the third source electrode 173$c$ and the third drain electrode 175$c$.

A passivation layer 180 is disposed on the data conductor 171, 173$h$, 173$l$, 173$c$, 175$h$, 175$l$, and 175$c$ and the semiconductors 154$h$, 154$l$, and 154$c$ exposed between the respective source electrodes 173$h$, 173$l$, and 173$c$ and the respective drain electrodes 175$h$, 175$l$, and 175$c$. The passivation layer 180 may be made of an organic insulating material or an inorganic insulating material, and may be formed as a single layer or multilayers.

A color filter 230 is formed in each pixel area PX on the passivation layer 180. Each color filter 230 may display one of the primary colors such as three primary colors of red, green, and blue. The color filter 230 is not limited to display the three primary colors of red, green, and blue, but may display cyan, magenta, yellow, and white-based colors. Unlike those illustrated above, the color filter 230 may be elongated in the column direction along between the adjacent data lines 171.

A light blocking member 220 is formed in a region between the adjacent color filters 230. The light blocking member 220 is formed to be overlapped with a boundary of the pixel PX, the thin film transistor, and the wall member 365 to prevent light leakage. The color filter 230 is formed in each of the first subpixel PXa and the second subpixel PXb, and the light blocking member 220 may be formed between the first subpixel PXa and the second subpixel PXb.

The light blocking member 220 includes a horizontal light blocking member 220a which extends along the gate line 121 and the step-down gate line 123 to be expanded upward and downward, and covers a region in which the first thin film transistor Qh, the second thin film transistor Ql, and the third thin film transistor Qc are disposed, and a vertical light blocking member 220b which extends along the data line 171. That is, the horizontal light blocking member 220a may be formed at the first valley V1, and the vertical light blocking member 220b may be formed at the second valley V2. The color filter 230 and the light blocking member 220 may be overlapped with each other in a partial region.

A first insulating layer 240 may be further formed on the color filter 230 and the light blocking member 220. The first insulating layer 240 may be made of an inorganic insulating material such as a silicon nitride (SiNx) and a silicon oxide (SiOx). The first insulating layer 240 serves to protect the color filter 230 made of the organic material and the light blocking member 220, and may be removed if necessary.

In the first insulating layer 240, the light blocking member 220, and the passivation layer 180, a plurality of first and second contact holes 185h and 185l that expose the wide end portions of the first and second drain electrode 175h and 175l, respectively, are formed.

A pixel electrode 191 is formed on the first insulating layer 240. The pixel electrode 191 may be made of a transparent metal material such as indium tin oxide (ITO) and indium zinc oxide (IZO).

The pixel electrode 191 includes the first subpixel electrode 191h and the second subpixel electrode 191l, which are separated from each other with the gate line 121 and the step-down gate line 123 therebetween and disposed above and below the pixel PX based on the gate line 121 and the step-down gate line 123 to be adjacent to each other in a column direction. That is, the first subpixel electrode 191h and the second subpixel electrode 191l are separated from each other by the first valley V1, the first subpixel electrode 191h is disposed in the first subpixel PXa, and the second subpixel electrode 191l is disposed in the second subpixel PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of the first subpixel electrode 192h and the second subpixel electrode 191I is a quadrangle, and the first subpixel electrode 191h and the second subpixel electrode 191I include cross stems including horizontal stems 193h and 193I and vertical stems 192h and 192I crossing the horizontal stems 193h and 193I, respectively. Further, the first subpixel electrode 191h and the second subpixel electrode 191I include a plurality of minute branches 194h and 194I, and protrusions 197h and 197I protruding upward or downward from edge sides of the subpixel electrodes 191h and 191I, respectively.

The pixel electrode 191 is divided into four sub-regions by the horizontal stems 193h and 193I and the vertical stems 192h and 192I. The minute branches 194h and 194l obliquely extend from the horizontal stems 193h and 193l and the vertical stems 192h and 192l, and the extending direction may form an angle of about 45 degrees or 135 degrees with the gate line 121 or the horizontal stems 193h and 193l. Further, directions in which the minute branches 194h and 194I of the two adjacent sub-regions extend may be perpendicular to each other.

In an embodiment, the first subpixel electrode 191h further includes an outer stem surrounding the outside, and the second subpixel electrode 191I includes horizontal portions disposed at an upper end and a lower end and left and right vertical portions 198 disposed at the left and the right of the first subpixel electrode 191h. The left and right vertical portions 198 may prevent capacitive coupling between the data line 171 and the first subpixel electrode 191h.

The layout form of the pixel area, the structure of the thin film transistor, and the shape of the pixel electrode described above are just exemplified, and the present invention is not limited thereto and may be variously modified.

A second insulating layer 250 may be further formed on the pixel electrode 191. The second insulating layer 250 may be made of an inorganic insulating material such as a silicon nitride (SiNx) and a silicon oxide (SiOx). The second insulating layer 250 serves to protect the pixel electrode 191 and may be removed if necessary.

A common electrode 270 is formed on the pixel electrode 191 to be spaced apart from the pixel electrode 191 by a predetermined distance. A microcavity 305 is formed between the pixel electrode 191 and the common electrode 270. That is, the microcavity 305 is surrounded by the pixel electrode 191 and the common electrode 270. A width and an area of the microcavity 305 may be variously modified depending on a size and resolution of the display device.

Even though the common electrode 270 is formed to be overlapped with the pixel electrode 191, since the second insulating layer 250 is formed on the pixel electrode 191, it is possible to prevent the common electrode 270 and the pixel electrode 191 which overlap each other from being short-circuited.

However, the present invention is not limited thereto, and the common electrode 270 may be formed directly on the second insulating layer 250. That is, the microcavity 305 is not formed between the pixel electrode 191 and common electrode 270, and the common electrode 270 may be formed with the pixel electrode 191 and the second insulating layer 250 therebetween. In an embodiment, the microcavity 305 may be formed on the common electrode 270.

The common electrode 270 may be made of a transparent metal material such as indium tin oxide (ITO) and indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the second insulating layer 250 which is not covered by the pixel electrode 191.

A second alignment layer 21 is formed below the common electrode 270 to face the first alignment layer 11.

The first alignment layer 11 and the second alignment layer 21 may be formed with vertical alignment layers and made of alignment materials such as polyamic acid, polysiloxane, and polyimide. The first and second alignment layers 11 may be connected to each other at an edge of the pixel PX.

A liquid crystal layer that includes liquid crystal molecules 310 is formed in the microcavity 305 disposed between the pixel electrode 191 and the common electrode 270. The liquid crystal molecules 310 have negative dielectric anisotropy and may stand up in a vertical direction to the substrate 110 while the electric field is not applied. That is, a vertical alignment may be implemented.

The first subpixel electrode 191h and the second subpixel electrode 191I to which the data voltage is applied generate an electric field together with the common electrode 270 to determine directions of the liquid crystal molecules 310 of the microcavity 305 between the two electrodes 191 and 270. As such, luminance of light passing through the liquid crystal layer varies depending on the determined directions of the liquid crystal molecules 310.

A third insulating layer 350 may be further formed on the common electrode 270. The third insulating layer 350 may be made of an inorganic insulating material such as a silicon nitride (SiNx) and a silicon oxide (SiOx), and may be removed if necessary.

A roof layer 360 is formed on the third insulating layer 350. The roof layer 360 may be made of an organic material. The microcavity 305 is formed below the roof layer 360, and the roof layer 360 is hardened by a curing process to maintain a shape of the microcavity 305. The roof layer 360 is formed to be spaced apart from the pixel electrode 191 with the microcavity 305 therebetween.

The roof layer 360 is formed in each pixel PX and the second valley V2 along a pixel row, and is not formed in the first valley V1. That is, the roof layer 360 is not formed between the first subpixel PXa and the second subpixel PXb. The microcavity 305 is formed below each roof layer 360 in each of the first subpixel PXa and the second subpixel PXb. In the second valley V2, the microcavity 305 is not formed below the roof layer 360, but is formed to be attached to the substrate 110. Accordingly, a thickness of the roof layer 360 disposed at the second valley V2 may be larger than a thickness of the roof layer 360 disposed in each of the first subpixel PXa and the second subpixel PXb. An upper surface and both sides of the microcavity 305 have a form to be covered by the roof layer 360.

An injection hole 307 exposing a portion of the microcavity 305 is formed at the roof layer 360. As described above, the injection holes 307 may be formed at one of the edges of the first subpixel PXa and the second subpixel PXb.

Since the microcavity 305 is exposed by the injection hole 307, an aligning agent or a liquid crystal material may be injected into the microcavity 305 through the injection hole 307.

A wall member 365 is formed at the microcavity 305 facing the injection hole 307 to close the microcavity 305 where the wall member 365 is formed.

For example, the wall member 365 may be formed at a lower side of the first subpixel PXa, and the injection hole 307 may be formed at an upper side of the second subpixel PXb. Further, when positions at which the injection hole 307 and the wall member 365 are formed are described based on the microcavity 305, the injection hole 307 and the wall member 365 are formed at two edges of each microcavity 305 facing each other.

The injection hole 307 is formed at one of two microcavities 305 facing each other with one first valley V1 therebetween, and the wall member 365 is formed at the other of two microcavities 305. In other words, the injection hole 307 is formed at one side of one microcavity 305 and the wall member 365 is formed at the other such that the microcavity 305 may be closed, and thus only one injection hole 305 for a liquid crystal material or an aligning agent is formed.

The wall member 365 may be made of the same material as the roof layer 360, and may be formed at the most lower or upper end of each of the roof layers 360 in a pixel row direction. In an embodiment, the injection hole 307 may be formed at an opposite side of the most lower or upper end of the roof layer 360 at which the wall member 365 is formed.

A third insulating layer 350 and a common electrode 270 may be further disposed below the wall member 365. The wall member 365 may be overlapped with the pixel electrode 191, and in an embodiment, the common electrode 270 may also be overlapped with the pixel electrode 191. Since the second insulating layer 250 is formed on the pixel electrode 191, a short circuit between the common electrode 270 and the pixel electrode 191 may be prevented.

However, the present invention is not limited thereto, and the wall member 365 may be made of a different material from the roof layer 360, and the third insulating layer 350 and the common electrode 270 may not be disposed below the wall member 365. In an embodiment, the wall member 365 may be formed directly on the pixel electrode 191, or may be formed directly on the second insulating layer 250 or the first insulating layer 240.

A hole 363 may be further included in the roof layer 360 adjacent to the wall member 365. A hole 363 may be formed at each microcavity 305. The hole may extend linearly parallel to the wall member 365 in a plan view of the display device.

The hole 363 may be formed at the common electrode 270 and the third insulating layer 350 formed below the roof layer 360, and at a fourth insulating layer 370 formed above the roof layer 360 such that the microcavity 305 may be exposed.

The wall member 365 may prevent an aligning agent or a liquid crystal aligning agent from extremely flowing into the microcavity when the aligning agent or the liquid crystal is injected, and the hole 363 may prevent occurrence of bubbles inside the microcavity 305 when the aligning agent or the liquid crystal is injected, such that alignment quality of the liquid crystal may be improved.

If the hole 363 is not formed, a portion at which the aligning agent or the liquid crystal is not filled may occur due to air-bubble occurrence while the aligning agent or the liquid crystal is being injected. Since the hole 363 is formed as described above, air may be discharged through the hole 363, and bubble occurrence may be minimized or substantially prevented.

The first alignment layer 11 and the second alignment layer 21 may be formed by injecting the aligning agent. In an embodiment, since the hole 363 is adjacent to the wall member 365 disposed at one edge of the microcavity 305, any lumping of the alignment layer may concentrate around the hole 363 due to capillary force in the hole 363 and may not significantly overlap the pixel area PX. Therefore, sufficient light can be transmitted through the pixel area PX, and satisfactory image quality may be attained. The fourth insulating layer 370 may be further formed on the roof layer 360. The fourth insulating layer 370 may be made of an inorganic insulating material such as a silicon nitride (SiNx) and a silicon oxide (SiOx). The fourth insulating layer 370 may be formed to cover the top and lateral surfaces of the roof layer 360. The fourth insulating layer 370 serves to protect the roof layer 360 made of an organic material, and may be removed if necessary.

A hole 363 may be formed at a position of the fourth insulating layer 370 corresponding to the hole 363.

An overcoat 390 may be formed on the fourth insulating layer 370. The overcoat 390 is formed to cover the injection hole 307 where a portion of the microcavity 305 is exposed to the outside. That is, the overcoat 390 may seal the microcavity 305 so that the liquid crystal molecules 310 contained in the microcavity 305 are not discharged outside. Since the overcoat 390 contacts the liquid crystal 310, the overcoat 390 may be made of a material that does not react with the liquid crystal 310. For example, the overcoat 390 may be made of parylene and the like.

The overcoat 390 may be formed with multilayers such as double layers and triple layers. The double layers are formed with two layers made of different materials. The triple layers are formed with three layers, and materials of adjacent layers are different from each other. For example, the overcoat 390 may include a layer made of an organic insulating material and a layer made of an inorganic insulating material.

Although not illustrated, polarizers may be further formed on the upper and lower surfaces of the display device. The polarizers may be formed as a first polarizer and a second polarizer. The first polarizer may be attached to the lower surface of the substrate 110, and the second polarizer may be attached to the overcoat 390.

Referring to FIG. 1, FIG. 2, and FIG. 3, the display device may include the substrate 110, the common electrode 270, the first subpixel electrode 191$h$, the second subpixel electrode 191$l$, a first liquid crystal layer, a second liquid crystal layer, the roof layer 360, the wall member 365, the overcoat 390, the insulating layer 350, the insulating layer 370, and/or the alignment layer 21. The common electrode 270 may overlap the substrate 110. The first subpixel electrode 191$h$ may be positioned between the substrate 110 and the common electrode 270. The second subpixel electrode 191$l$ may be insulated from the first subpixel electrode 191$h$ and may be positioned between the substrate 110 and the common electrode 270. The first liquid crystal layer may be positioned between the first subpixel electrode 191$h$ and the common electrode 270. The second liquid crystal layer may be positioned between the second subpixel electrode 191$l$ and the common electrode 270. The wall member 365 may be formed of an organic material, may be positioned between the first liquid crystal layer and the second liquid crystal layer, may partially overlap the first subpixel electrode 191$h$, and may be as wide as or wider than the first subpixel electrode 191$h$ in a plan view of the display device.

The common electrode 270 may be positioned between the substrate 110 and the overcoat 390. The wall member 365 may be positioned between the first liquid crystal layer and a first portion of the overcoat 390. The first portion of the overcoat 390 may be positioned between the wall member 365 and a second portion of the overcoat 390. The second portion of the overcoat 390 may directly contact the second liquid crystal layer and may be positioned between the second liquid crystal layer and the first portion of the overcoat 390.

The first liquid crystal layer may be positioned between the first subpixel electrode 191$h$ and a first portion of the roof layer 360. The wall member 365 may be positioned between the first subpixel electrode 191$h$ and a second portion of the roof layer 360 and may be directly connected to the second portion of the roof layer 360. The first portion of the roof layer 360 may be spaced from the second portion of the roof layer 360.

A hole 363 may be positioned between the first portion of the roof layer 360 and the second portion of the roof layer 360.

The first liquid crystal layer may be positioned between the first subpixel electrode 191$h$ and a first portion of the insulating layer 350. The wall member 365 may directly contact a second portion of the insulating layer 350. The first portion of the insulating layer 350 may be spaced from the second portion of the insulating layer 350. The insulating layer 370 may directly contact the overcoat 390. The first liquid crystal layer may be positioned between the first subpixel electrode 191$h$ and a first portion of the insulating layer 370. The wall member 365 may be positioned between the first subpixel electrode 191$h$ and a second portion of the insulating layer 370. The first portion of the insulating layer 370 may be spaced from the second portion of the insulating layer 370.

The first liquid crystal layer may be positioned between the first subpixel electrode 191$h$ and a first portion of the common electrode 270. A second portion of the common electrode 270 may be positioned the first liquid crystal layer and the wall member 365. The first portion of the common electrode 270 may be spaced from the second portion of the common electrode 270. The hole 363 may be positioned between a portion of the overcoat 390 and the second portion of the common electrode 270.

The alignment layer 21 may directly contact the common electrode 270. The wall member 365 may be positioned between a first portion of the alignment layer 21 and a second portion of the alignment layer 21. The second portion of the alignment layer 21 may be positioned between the wall member 365 and a portion of the overcoat 390. A hole 301 may be positioned between the substrate 110 and the second portion of the alignment layer 21. The hole 301 may be positioned between the wall member 365 and a portion of the overcoat 390.

A portion of the common electrode 270 may be positioned between the wall member 365 and the first subpixel electrode 191$h$ in a direction perpendicular to the substrate.

Figure 5:
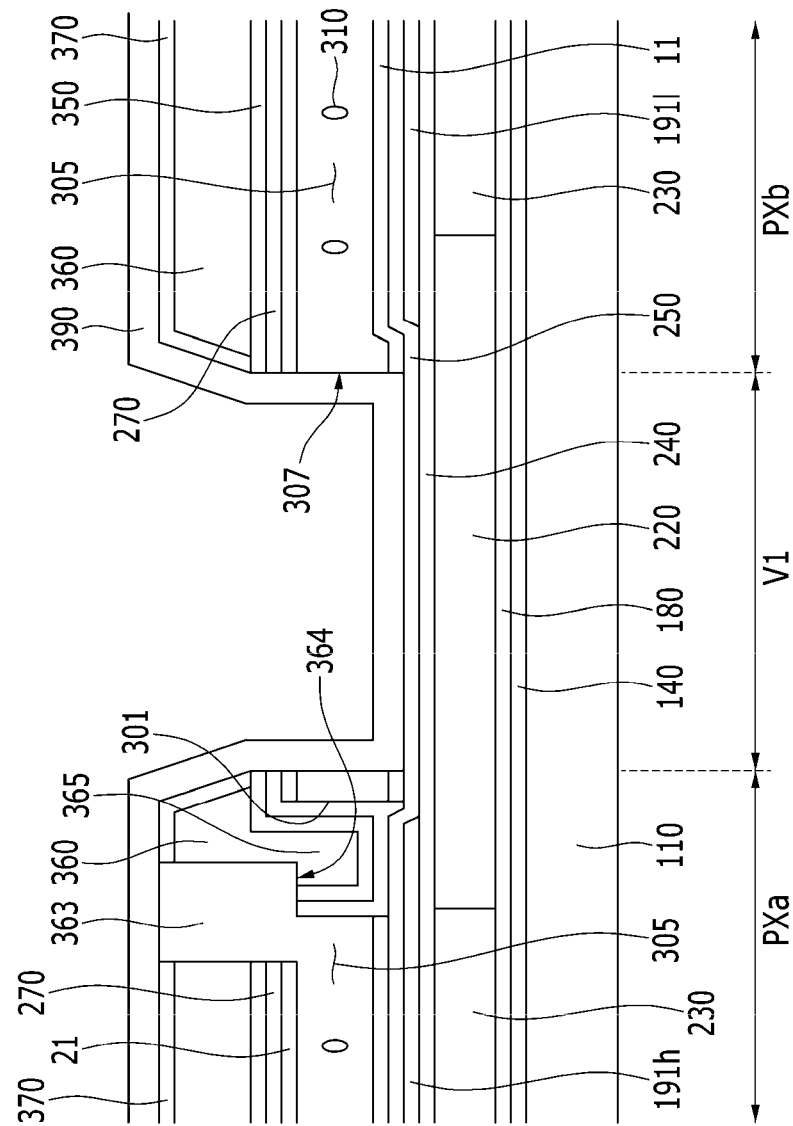
FIG. 5 is a schematic cross-sectional illustrating elements and/or structures in a display device according to an embodiment.

FIG. 5 is a schematic cross-sectional view illustrating elements and/or structures in a display device according to an embodiment. Some features of the display device associated with FIG. 5 may be analogous to some features discussed with reference to one or more of FIG. 1, FIG. 2, FIG. 3, and FIG. 4. Some features of the display device associated with FIG. 5 may be identical to some features discussed with reference to one or more of FIG. 1, FIG. 2, FIG. 3, and FIG. 4. Description related to analogous and/or identical features may not be repeated.

Referring to FIG. 5, the wall member 365 includes a step member 364. The hole 363 is positioned between the overcoat 390 and the step portion 364 of the wall member 365.

Referring to FIG. 1, FIG. 2, and FIG. 5, the display device may include the substrate 110, the common electrode 270, the first subpixel electrode 191$h$, the second subpixel electrode 191*l*, a first liquid crystal layer, a second liquid crystal layer, the roof layer 360, the wall member 365, the overcoat 390, the insulating layer 350, the insulating layer 370, and/or the alignment layer 21. The common electrode 270 may overlap the substrate 110. The first subpixel electrode 191*h* may be positioned between the substrate 110 and the common electrode 270. The second subpixel electrode 191*l* may be insulated from the first subpixel electrode 191*h* and may be positioned between the substrate 110 and the common electrode 270. The first liquid crystal layer may be positioned between the first subpixel electrode 191*h* and the common electrode 270. The second liquid crystal layer may be positioned between the second subpixel electrode 191*l* and the common electrode 270. The wall member 365 may be formed of an organic material, may be positioned between the first liquid crystal layer and the second liquid crystal layer, may partially overlap the first subpixel electrode 191*h*, and may be as wide as or wider than the first subpixel electrode 191*h* in a plan view of the display device.

The common electrode 270 may be positioned between the substrate 110 and the overcoat 390. The wall member 365 may be positioned between the first liquid crystal layer and a first portion of the overcoat 390. The first portion of the overcoat 390 may be positioned between the wall member 365 and a second portion of the overcoat 390. The second portion of the overcoat 390 may directly contact the second liquid crystal layer and may be positioned between the second liquid crystal layer and the first portion of the overcoat 390.

The first liquid crystal layer may be positioned between the first subpixel electrode 191*h* and a first portion of the roof layer 360. The wall member 365 may be positioned between the first subpixel electrode 191*h* and a second portion of the roof layer 360 and may be directly connected to the second portion of the roof layer 360. The first portion of the roof layer 360 may be spaced from the second portion of the roof layer 360.

A first portion of the wall member 365 may be positioned between the first subpixel electrode 191*h* and a second portion of the wall member 365, may be connected through the second portion of the wall member 365 to the second portion of roof layer 360, and may be wider than the second portion of the wall member 365.

The overcoat 390 may directly contact the second liquid crystal layer. The hole 363 may be positioned between a portion of the overcoat 390 and the first portion of the wall member 365.

A hole 363 may be positioned between the first portion of the roof layer 360 and the second portion of the roof layer 360.

The overcoat 390 may directly contact the second liquid crystal layer. The hole 363 may be positioned between a portion of the overcoat 390 and a portion of the common electrode 270.

The first liquid crystal layer may be positioned between the first subpixel electrode 191*h* and a first portion of the insulating layer 350. The wall member 365 may directly contact a second portion of the insulating layer 350. The first portion of the insulating layer 350 may be spaced from the second portion of the insulating layer 350. The hole 363 may be positioned between a portion of the overcoat 390 and the second portion of the insulating layer 350.

The insulating layer 370 may directly contact the overcoat 390. The first liquid crystal layer may be positioned between the first subpixel electrode 191*h* and a first portion of the insulating layer 370. The wall member 365 may be positioned between the first subpixel electrode 191*h* and a second portion of the insulating layer 370. The first portion of the insulating layer 370 may be spaced from the second portion of the insulating layer 370.

The first liquid crystal layer may be positioned between the first subpixel electrode 191*h* and a first portion of the common electrode 270. A second portion of the common electrode 270 may be positioned the first liquid crystal layer and the wall member 365. The first portion of the common electrode 270 may be spaced from the second portion of the common electrode 270. The hole 363 may be positioned between a portion of the overcoat 390 and the second portion of the common electrode 270.

The alignment layer 21 may directly contact the common electrode 270. The wall member 365 may be positioned between a first portion of the alignment layer 21 and a second portion of the alignment layer 21. The second portion of the alignment layer 21 may be positioned between the wall member 365 and a portion of the overcoat 390. A liquid crystal material portion may directly contact a (vertical) portion of the common electrode 270 and may be positioned between the substrate 110 and the second portion of the alignment layer 21. The liquid crystal material portion may be positioned between the wall member 365 and a portion of the overcoat 390 and may be positioned between the portion of the common electrode 270 and the portion of the overcoat 390.

The hole 363 may be positioned between a first portion of the overcoat 390 and a portion of the wall member 365. The portion of the wall member 365 may be positioned between a second portion of the overcoat 390 and the first liquid crystal layer.

According to an embodiment, the hole 363 may extend over the step member 364 of the wall member 365, such that hole 363 may effectively minimize aligning agent lumping and/or accommodate excess aligning agent. Advantageously, the alignment layers 11 and 21 may be optimally formed, and the aperture ratio associated with the display device may be optimized.

Figure 6:
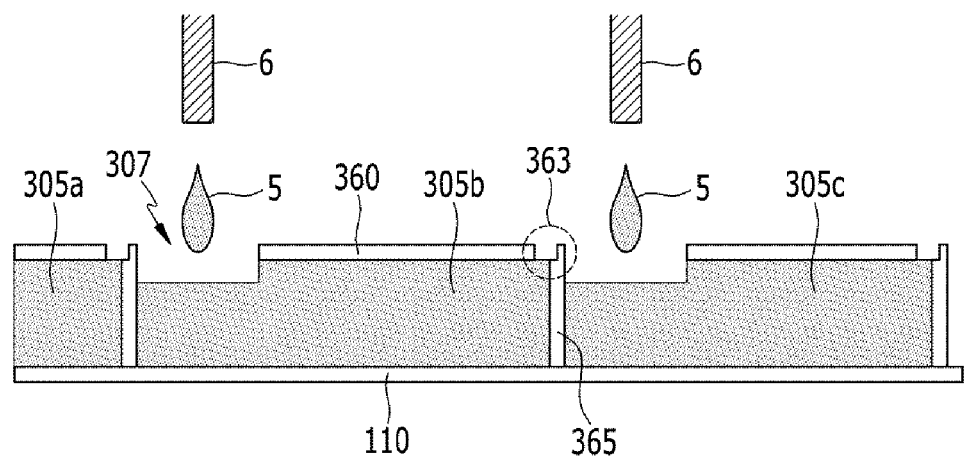
FIG. 6 is a schematic diagram illustrating one or more advantages associated with a wall member and a hole according to an embodiment.

FIG. 6 is a schematic diagram illustrating one or more advantages associated with a wall member 365 and a hole 363 according to an embodiment. Referring to FIG. 6, an injection nozzle 6 may provide a set of aligning agent 5 into an intended microcavity 305, and a wall member 365 may prevent the aligning agent 5 from flowing to an unintended microcavity 305. Therefore, unwanted mixture of different sets of aligning agent 5 may be minimized or substantially prevented.

A hole 363 may facilitate exit of air when a set of aligning agent 5 is provided into a corresponding microcavity 305 and may accommodate excess aligning agent 5. Therefore, unwanted air bubbles and/or unwanted lumps in alignment layers may be minimized and/or substantially prevented. Advantageously, alignment layers may be formed with satisfactory quality.

FIG. 7, FIG. 8, FIG. 9, FIG. 10, and FIG. 11 are schematic cross-sectional views illustrating steps in a method for manufacturing a display device according to an embodiment.

Figure 7:
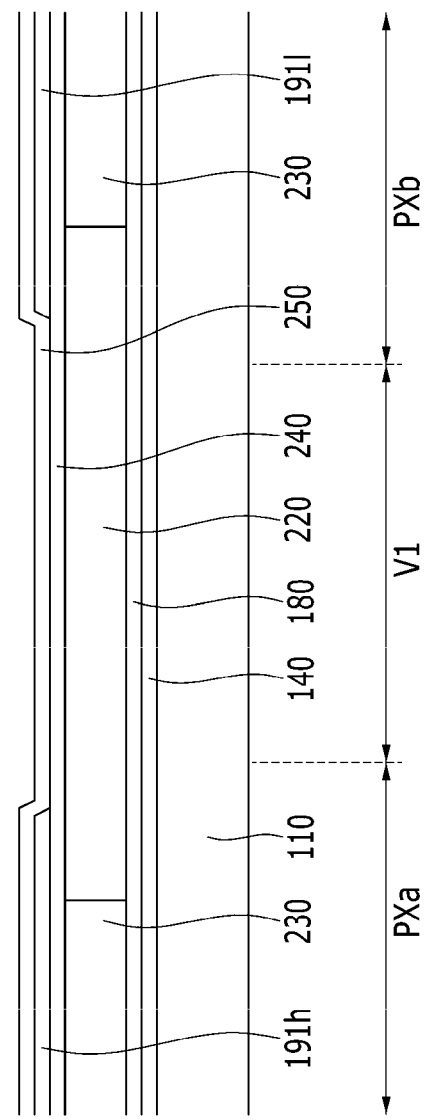
FIG. 7, FIG. 8, FIG. 9, FIG. 10, and FIG. 11 are schematic cross-sectional views illustrating steps in a method for manufacturing a display device according to an embodiment.

First, referring to FIG. 7, a gate line 121 and a step-down gate line 123 extending in one direction are formed on a substrate 110 made of glass or plastic, and a first gate electrode 124*h*, a second gate electrode 124*l*, and a third gate electrode 124*c* which protrude from the gate line 121 are formed.

Further, a storage electrode line 131 may be formed together to be spaced apart from the gate line 121, the step-down gate line 123, and the first, second, and third gate electrodes 124h, 124l, and 124c.

Next, a gate insulating layer 140 is formed on the entire surface of a substrate 110 including the gate line 121, the step-down gate line 123, the first to third gate electrodes 124h, 124l, and 124c, and the storage electrode 131 by using an inorganic insulating material such as a silicon oxide or a silicon nitride. The gate insulating layer 140 may be formed by a single layer or multilayers.

Next, a first semiconductor 154h, a second semiconductor 154l, and a third semiconductor 154c are formed by depositing a semiconductor material such as amorphous silicon, polycrystalline silicon, and a metal oxide on the gate insulating layer 140 and then patterning the deposited semiconductor material. The first semiconductor 154h may be disposed on the first gate electrode 124h, the second semiconductor 154l may be disposed on the second gate electrode 124I, and the third semiconductor 154c may be disposed on the third gate electrode 124c.

Next, a data line 171 extending in the other direction is formed by depositing a metal material and then patterning the deposited metal material. The metal material may be formed by a single layer or multilayers.

Further, a first source electrode 173h protruding above the first gate electrode 124h from the data line 171 and a first drain electrode 175h spaced apart from the first source electrode 173h are formed together. Further, a second source electrode 173l connected with the first source electrode 173h and a second drain electrode 175l spaced apart from the second source electrode 173l are formed together. Further, a third source electrode 173c extended from the second drain electrode 175l and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing a semiconductor material and a metal material and then patterning the semiconductor material and the metal material at the same time. In an embodiment, the first semiconductor 154h may be extended to the lower portion of the data line 171.

The first, second, and third gate electrodes 124h, 124l, and 124c, the first, second, and third source electrodes 173h, 173l, and 173c, and the first, second, and third drain electrodes 175h, 175l, and 175c form first, second, and third thin film transistors (TFTs) Qh, Ql, and Qc together with the first, second, and third semiconductors 154h, 154l, and 154c, respectively.

Next, a passivation layer 180 is formed on the data line 171, the first to third source electrodes 173h, 173l, and 173c, the first to third drain electrodes 175h, 175l, and 175c, and the semiconductors 154h, 154l, and 154c exposed between the respective source electrodes 173h, 173l, and 173c and the respective drain electrodes 175h, 175l, and 175c. The passivation layer 180 may be made of an organic insulating material or an inorganic insulating material, and may be formed as a single layer or a multilayer.

Next, a color filter 230 is formed in each pixel PX on the passivation layer 180. The color filter 230 is formed in each of the first subpixel PXa and the second subpixel PXb, and may not be formed at the first valley V1. The color filters 230 having the same color may be formed in a column direction of the plurality of pixels PX. In the case of forming the color filters 230 having three colors, a first colored color filter 230 may be first formed and then a second colored color filter 230 may be formed by shifting a mask. Next, after the second colored color filter 230 is formed, a third colored color filter may be formed by shifting a mask.

Next, a light blocking member 220 is formed on a boundary of each pixel PX on the passivation layer 180 and the thin film transistor. The light blocking member 220 may be formed at the first valley V1 disposed between the first subpixel PXa and the second subpixel PXb.

Further, the light blocking member 220 is formed at one edge of each pixel PX. The light blocking member 220 is formed to correspond to a portion that is overlapped with a support member 365 to be formed later.

Hereinabove, it is described that the light blocking member 220 is formed after forming the color filters 230, but the present invention is not limited thereto, and the light blocking member 220 may be first formed and then the color filters 230 may be formed.

Next, a first insulating layer 240 made of an inorganic insulating material such as a silicon nitride (SiNx) and a silicon oxide (SiOx) is formed on the color filter 230 and the light blocking member 220.

Next, a first contact hole 185h is formed by etching the passivation layer 180, the light blocking member 220, and the first insulating layer 240 to expose a portion of the first drain electrode 175h, and a second contact hole 185l is formed to expose a portion of the second drain electrode 175l.

Next, a first subpixel electrode 191h is formed in the first subpixel area PXa and a second subpixel electrode 191l is formed in the second subpixel area PXb by depositing and patterning a transparent metal material such as indium tin oxide (ITO) and indium zinc oxide (IZO) on the first insulating layer 240. The first subpixel electrode 191h and the second subpixel electrode 191l are separated from each other with the first valley V1 therebetween. The first subpixel electrode 191h is connected with the first drain electrode 175h through the first contact hole 185h, and the second subpixel electrode 191l is connected with the second drain electrode 175l through the second contact hole 185l.

Horizontal stems 193h and 193l and vertical stems 192h and 192l crossing the horizontal stems 193h and 193l are formed in the first subpixel electrode 191h and the second subpixel electrode 191l, respectively. Further, a plurality of minute branches 194h and 194l that obliquely extend from the horizontal stems 193h and 193l and the vertical stems 192h and 192l are formed.

Next, a second insulating layer 250 may be further formed on the pixel electrode 191 with an inorganic insulating material such as a silicon nitride (SiNx) and a silicon oxide (SiOx).

Figure 8:
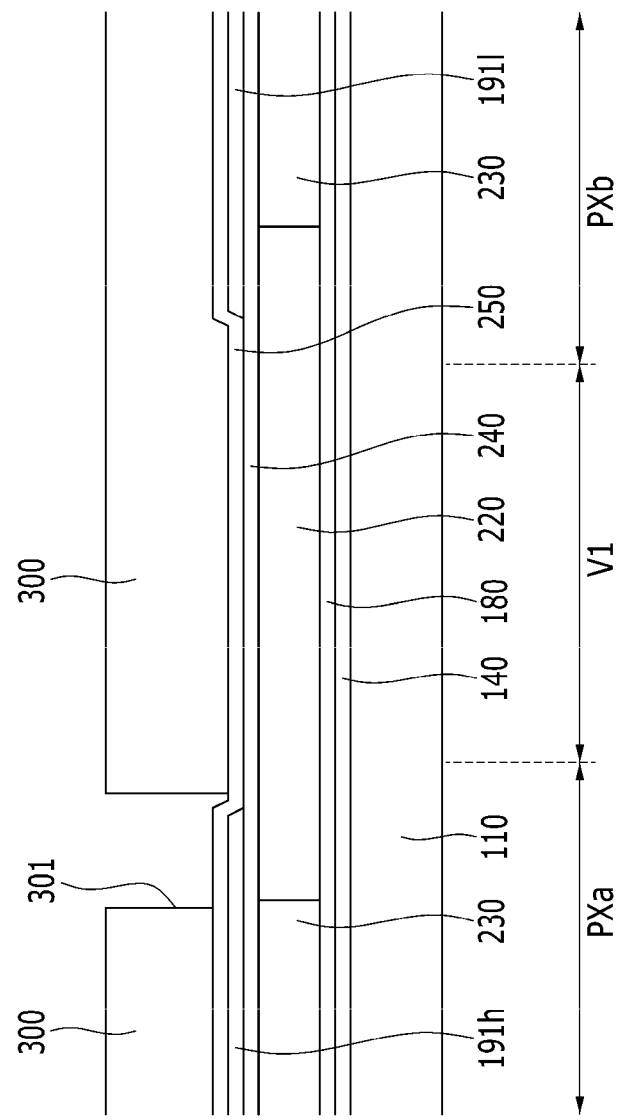

Referring to FIG. 8, a sacrificial layer 300 is formed by coating a photosensitive organic material on the pixel electrode 191 and performing a photolithography process.

The sacrificial layers 300 are formed to be connected to each other along the plurality of pixel columns. That is, the sacrificial layer 300 is formed to cover each pixel PX and to cover the first valley V1 disposed between the first subpixel PXa and the second subpixel PXb.

That is, the photosensitive organic material disposed at the second valley V2 is removed by the photolithography process. Further, an opening 301 (or hole 301) is formed by removing a partial region of the sacrificial layer 300 through the photolithography process. The opening 301 may be continuously formed to be adjacent to one side of the first valley V1 along the first valley V1. The second insulating layer 250 disposed below the photosensitive organic material is exposed by forming the opening 301.

Figure 9:
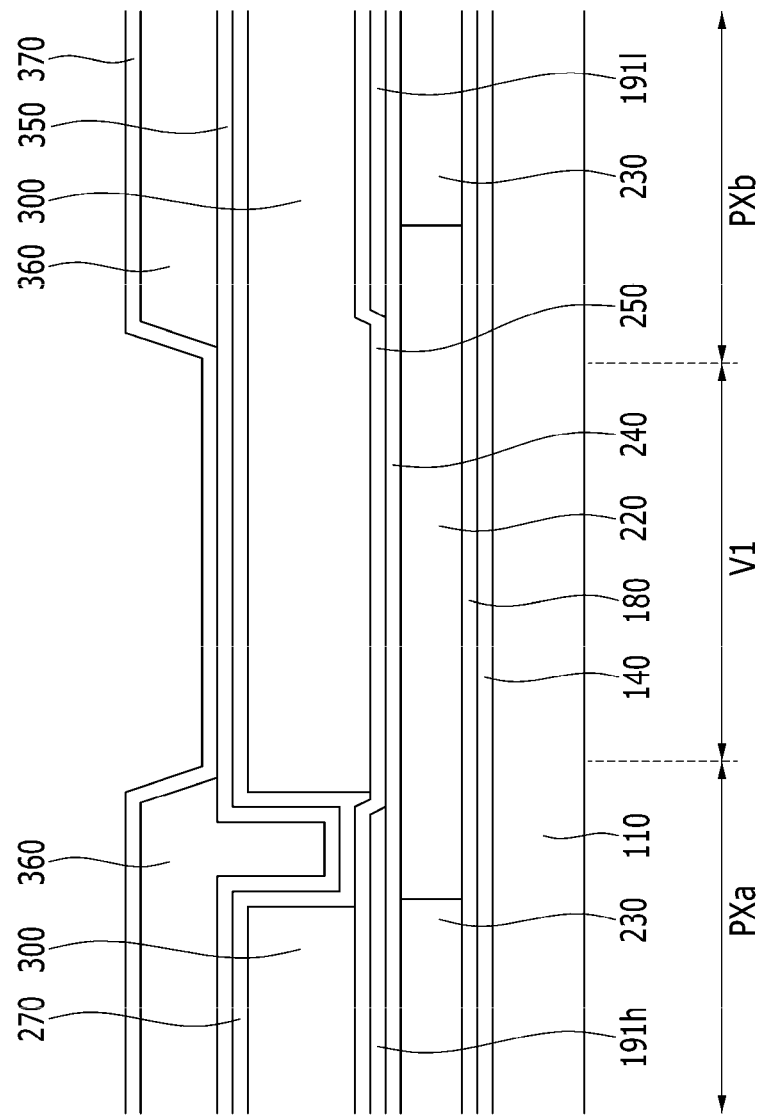

Referring to FIG. 9, a common electrode 270 is formed by depositing a transparent metal material such as indium tin oxide (ITO) and indium zinc oxide (IZO) on the sacrificial layer 300.

Next, a third insulating layer 350 may be formed on the common electrode 270 with an inorganic insulating material such as a silicon oxide and a silicon nitride. Next, a roof layer 360 is formed on the third insulating layer 350 with an organic material, and a wall member 365 is formed in the opening 301. The roof layer 360 and the wall member 365 may be formed with the same material through the same process.

By coating an organic material on the entire substrate 110 after forming the third insulating layer 350, the roof layer 360 and the wall member 365 may be simultaneously formed. That is, the roof layer 360 and the wall member 365 may be formed with the same material through the same process.

The common electrode 270 and the third insulating layer 350 are disposed below the roof layer 360 and the wall member 365. The wall member 365 may be formed to be overlapped with the pixel electrode 191. In an embodiment, since the second insulating layer 250 is formed on the pixel electrode 191, a short circuit between the common electrode 270 disposed below the wall member 365 and the pixel electrode 191 may be prevented.

Figure 10:
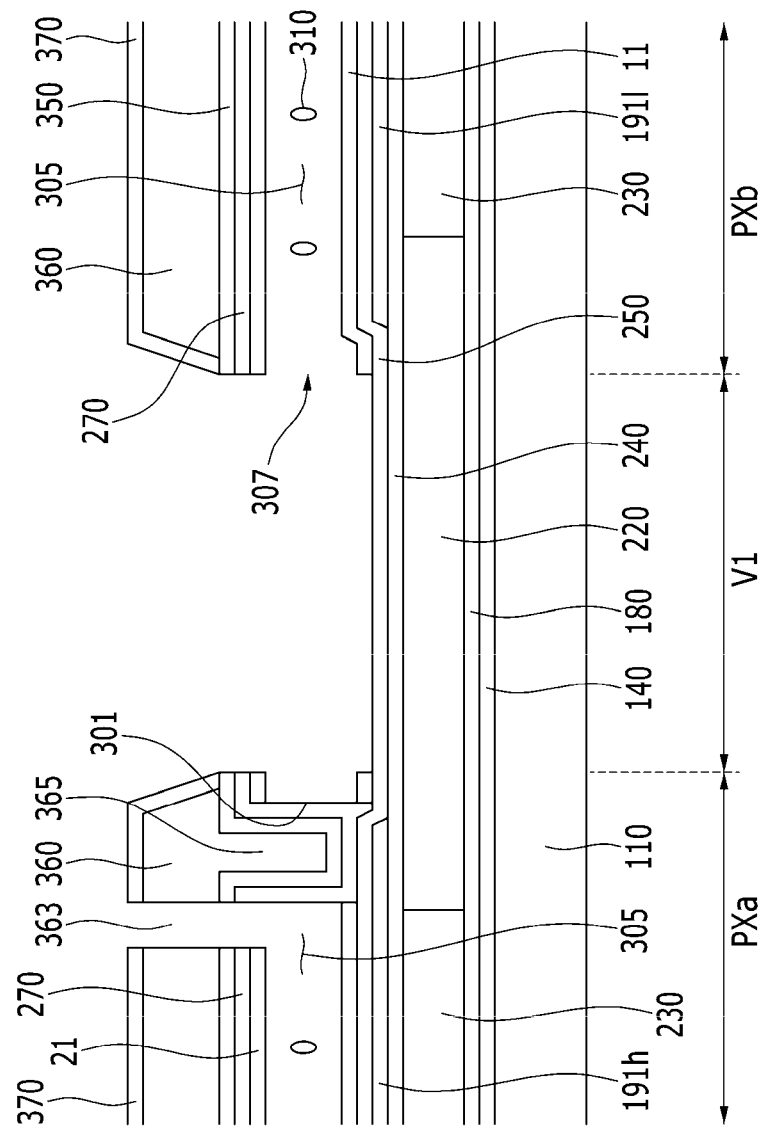

Referring to FIG. 10, the roof layer 360 disposed at the first valley V1 may be removed by patterning the roof layer 360. Accordingly, the roof layers 360 may be formed to be connected to each other along a plurality of pixel rows.

Next, a fourth insulating layer 370 may be formed on the roof layer 360 with an inorganic insulating material such as a silicon nitride (SiNx) and a silicon oxide (SiOx). The fourth insulating layer 370 may be formed on the patterned roof layer 360 to cover and protect the side of the roof layer 360.

The fourth insulating layer 370, the third insulating layer 350, and the common electrode 270 disposed at the first valley V1 are removed by patterning the fourth insulating layer 370, the third insulating layer 350, and the common electrode 270.

The sacrificial layer 300 disposed at the first valley V1 is exposed outside by patterning the roof layer 360 and the common electrode 270.

Next, the sacrificial layer 300 is fully removed by supplying a developer on the substrate 110 where the sacrificial layer 300 is exposed, or the sacrificial layer 300 is fully removed by an ashing process.

When the sacrificial layer 300 is removed, the microcavity 305 is formed at a position where the sacrificial layer 300 is disposed.

The pixel electrode 191 and the common electrode 270 are spaced apart from each other with the microcavity 305 therebetween, and the pixel electrode 191 and the roof layer 360 are spaced apart from each other with the microcavity 305 therebetween. The common electrode 270 and the roof layer 360 are formed to cover the top and both sides of the microcavity 305.

An injection hole 307 that exposes the microcavity 305 to the outside is formed in portions where the roof layer 360 and the common electrode 270 are removed.

The wall member 365 is formed at the microcavity 305 facing the injection hole 307 to close the microcavity 305 at which the wall member 365 is formed.

The injection hole 307 and the wall member 365 are formed along the first valley V1.

For example, the wall member 365 may be formed at a lower side of the first subpixel PXa, and the injection hole 307 may be formed at an upper side of the second subpixel PXb. Further, when positions at which the injection hole 307 and the wall member 365 are formed are described based on the microcavity 305, the injection hole 307 and the wall member 365 are formed at two edges of each microcavity 305 facing each other.

The injection hole 307 is formed at one of two microcavities 305 facing each other with one first valley V1 therebetween, and the wall member 365 is formed at the other of two microcavities 305. In other words, the injection hole 307 is formed at one side of one microcavity 305, and the wall member 365 is formed at the other, such that the microcavity 305 may be closed, and thus, only one injection hole 305 for a liquid crystal material or an aligning agent is formed.

That is, the wall member 365 may be formed at the most lower or upper end of each of the roof layers 360 in a pixel row direction. In an embodiment, the injection hole 307 may be formed at an opposite side of the most lower or upper end of the roof layer 360 at which the wall member 365 is formed.

Next, a hole 363 is formed at a region adjacent to the wall member formed at the roof layer 360. A hole 363 may be formed at each microcavity 305. The hole 363 may extend linearly parallel to the wall member 365 in a plan view of the display device.

The hole 363 may be formed at the common electrode 270 and the third insulating layer 350 formed below the roof layer 360 and at a fourth insulating layer 370 formed above the roof layer 360 such that the microcavity 305 may be exposed.

The hole 363 may be formed before the sacrificial layer 300 is entirely removed.

Next, the roof layer 360 is cured by applying heat to the substrate 110. This is to maintain the shape of the microcavity 305 by the roof layer 360.

Next, when an aligning agent including an alignment material is dripped on the substrate 110 by a spin coating method or an inkjet method, the aligning agent is injected into the microcavity 305 through the injection hole 307. When the aligning agent is injected into the microcavity 305 and then a curing process is performed, a solution component is evaporated and the alignment material remains on the inner wall of the microcavity 305.

Since the aligning agent is separately injected into each microcavity 305 depending on the wall member 365, and the inner air of the microcavity 305 is discharged through the hole 363, the aligning agent is easily injected into the microcavity 305. Further, the solid content of the aligning agent is lumped around the hole 363 to close and seal the hole 363.

Accordingly, the first alignment layer 11 may be formed above the pixel electrode 191, and the second alignment layer 21 may be formed below the common electrode 270. The first alignment layer 11 and the second alignment layer 21 are formed to face each other with the microcavity 305 therebetween, and to be connected to each other at edges of the pixel area PX.

The first and second alignment layers 11 and 21 may be aligned in a direction perpendicular to the substrate 110, except at the lateral surface of the microcavity 305. In addition, a process of irradiating UV to the first and second alignment layers 11 and 21 is performed, and as a result, the first and second alignment layers 11 and 21 may be aligned in a direction parallel to the substrate 110.

Next, when the liquid crystal material including the liquid crystal molecules 310 is dripped on the substrate 110 by an inkjet method or a dispensing method, the liquid crystal material is injected into the microcavity 305 through the injection hole 307.

When the liquid crystal material is dripped in the injection hole 307 formed along the first valleys V1, the liquid crystal material passes through the injection hole 307 by capillary force to be injected into the microcavity 305. A liquid crystal material portion may attach to an exposed vertical portion of the common electrode 270.

Figure 11:
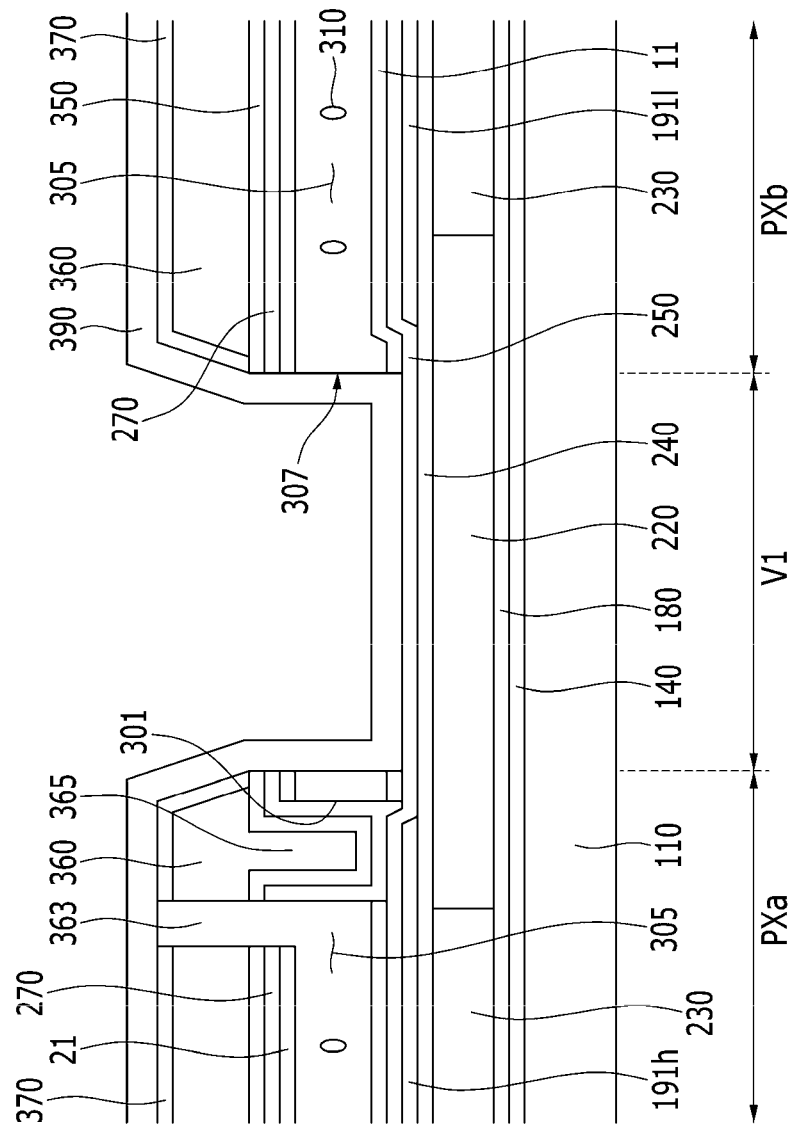

Next, referring to FIG. 11, an overcoat 390 is formed by depositing a material that does not react with the liquid crystal molecules 310 on the fourth insulating layer 370. The overcoat 390 is formed to cover the injection hole 307 where the microcavity 305 is exposed outside to seal the microcavity 305.

Next, although not illustrated, polarizers may be further attached to the upper and lower surfaces of the display device. The polarizers may be formed as a first polarizer and a second polarizer. The first polarizer may be attached to the lower surface of the substrate 110, and the second polarizer may be attached on the overcoat 390.

As can be appreciated from FIG. 7, FIG. 8, FIG. 9, FIG. 10, and FIG. 11, the method may include the following steps: providing the substrate 110; providing the roof layer 360, which may be formed of an organic material; providing the common electrode 270, which may be positioned between the substrate 110 and the roof layer 360; providing the first subpixel electrode 191h, which may be positioned between the substrate 110 and the common electrode 270; and providing a first liquid crystal layer, which may be positioned between the first subpixel electrode 191h and a first portion of the roof layer 360. A second portion of roof layer 360 may be spaced from the first portion of the roof layer 360. The second portion of the roof layer 360 may overlap the first subpixel electrode 191h without overlapping the first liquid crystal layer in a direction perpendicular to the substrate 110. A first portion (e.g., upper portion) of the hole 363 may be positioned between the first portion of the roof layer 360 and the second portion of the roof layer 360.

The method may include providing the wall member 365, which may be formed of the organic material and may be directly connected to the second portion of the roof member. A second portion (e.g., lower portion) of the hole 363 may be positioned between a portion of the common electrode 270 and a portion of the wall member 365 in a direction parallel to the substrate 110.

According to embodiments, a display device may include only one substrate. Advantageously, weight, thickness, cost, and/or manufacturing time associated with the display device may be minimized.

According to embodiments, a wall member and/or a hole may enable optimal formation of an alignment layer in a display device. Therefore, alignment of liquid crystal molecules in the display device may be optimized, and an aperture ratio of the display device may be optimized. Advantageously, images displayed by the display device may be satisfactory.

While some embodiments have been described as examples, possible embodiments are not limited to the described embodiments. Embodiments are intended to cover various modifications and equivalent arrangements within the spirit and scope defined by the appended claims.

What is claimed is:

1. A display device comprising:
   a substrate;
   a first subpixel electrode and
   a second subpixel electrode disposed on the substrate;
   a roof layer overlapping the substrate;
   a first liquid crystal layer, which is disposed between the first subpixel electrode and the roof layer;
   a second liquid crystal layer, which is disposed between the second subpixel electrode and the roof layer; and
   a wall member, which is formed of an organic material, is disposed between the first liquid crystal layer and the second liquid crystal layer,
   wherein the roof layer has a hole connected to the first liquid crystal layer through the roof layer.

2. The display device of claim 1, further comprising:
   an overcoat,
   a common electrode disposed between the substrate and the overcoat,
   wherein the wall member is disposed between the first liquid crystal layer and a first portion of the overcoat,
   wherein the first portion of the overcoat is disposed between the wall member and a second portion of the overcoat, and
   wherein the second portion of the overcoat directly contacts the second liquid crystal layer and is disposed between the second liquid crystal layer and the first portion of the overcoat.

3. The display device of claim 1,
   wherein the first liquid crystal layer is disposed between the first subpixel electrode and a first portion of the roof layer,
   wherein the wall member is disposed between the first subpixel electrode and a second portion of the roof layer and is directly connected to the second portion of the roof layer, and
   wherein the first portion of the roof layer is spaced from the second portion of the roof layer.

4. The display device of claim 3,
   wherein a first portion of the wall member is disposed between the first subpixel electrode and a second portion of the wall member, is connected through the second portion of the wall member to the second portion of roof layer, and is wider than the second portion of the wall member.

5. The display device of claim 4, further comprising
   an overcoat, which directly contacts the second liquid crystal layer,
   wherein the hole is disposed between a portion of the overcoat and the first portion of the wall member.

6. The display device of claim 3,
   wherein the hole is disposed between the first portion of the roof layer and the second portion of the roof layer.

7. The display device of claim 6, further comprising:
   an overcoat, which directly contacts the second liquid crystal layer,
   wherein the hole is disposed between a portion of the overcoat and a portion of the common electrode.

8. The display device of claim 1, further comprising:
   an insulating layer,
   wherein the first liquid crystal layer is disposed between the first subpixel electrode and a first portion of the insulating layer,
   wherein the wall member directly contacts a second portion of the insulating layer, and
   wherein the first portion of the insulating layer is spaced from the second portion of the insulating layer.

9. The display device of claim 8, further comprising:
an overcoat, which directly contacts the second liquid crystal layer,
wherein the hole is disposed between a portion of the overcoat and the second portion of the insulating layer.

10. The display device of claim 1, further comprising:
an overcoat, which directly contacts the second liquid crystal layer; and
an insulating layer, which directly contacts the overcoat,
wherein the first liquid crystal layer is disposed between the first subpixel electrode and a first portion of the insulating layer,
wherein the wall member is disposed between the first subpixel electrode and a second portion of the insulating layer, and
wherein the first portion of the insulating layer is spaced from the second portion of the insulating layer.

11. The display device of claim 1,
wherein the first liquid crystal layer is disposed between the first subpixel electrode and a first portion of a common electrode,
wherein a second portion of the common electrode is disposed the first liquid crystal layer and the wall member, and
wherein the first portion of the common electrode is spaced from the second portion of the common electrode.

12. The display device of claim 11, further comprising:
an overcoat, which directly contacts the second liquid crystal layer,
wherein the hole is disposed between a portion of the overcoat and the second portion of the common electrode.

13. The display device of claim 1, further comprising:
an alignment layer, which directly contacts the common electrode;
an overcoat, which directly contacts the second liquid crystal layer,
wherein the wall member is disposed between a first portion of the alignment layer and a second portion of the alignment layer, and
wherein the second portion of the alignment layer is disposed between the wall member and a portion of the overcoat.

14. The display device of claim 13,
wherein a liquid crystal material portion is disposed between the substrate and the second portion of the alignment layer.

15. The display device of claim 1, further comprising:
a common electrode disposed between the wall member and the first subpixel electrode in a direction perpendicular to the substrate.

16. A display device comprising:
a substrate;
a light blocking member, which overlaps the substrate;
a roof layer, which is formed of an organic material;
a common electrode, which is disposed between the substrate and the roof layer;
a first subpixel electrode, which is disposed between the substrate and the common electrode; and
a first liquid crystal layer, which is disposed between the first subpixel electrode and a first portion of the roof layer in a first direction,
wherein a second portion of roof layer is spaced from the first portion of the roof layer in a second direction perpendicular to the first direction,
wherein the second portion of the roof layer is spaced from and disposed over the light blocking member in the first direction, and
wherein the second portion of the roof layer is disposed over the first subpixel electrode without being disposed over the first liquid crystal layer in the first direction.

17. The display device of claim 16,
wherein a through hole is disposed between the first portion of the roof layer and the second portion of the roof layer.

18. The display device of claim 17, comprising:
a wall member, which is formed of the organic material and is directly connected to the second portion of the roof member; and
an overcoat, which overlaps the roof layer,
wherein the hole is disposed between a first portion of the overcoat and a portion of the wall member, and
wherein the portion of the wall member is disposed between a second portion of the overcoat and the first liquid crystal layer.

19. A method for manufacturing a display device, the method comprising:
providing a substrate;
providing a light blocking member, which overlaps the substrate;
providing a roof layer, which is formed of an organic material;
providing a common electrode, which is disposed between the substrate and the roof layer;
providing a first subpixel electrode, which is disposed between the substrate and the common electrode; and
providing a first liquid crystal layer, which is disposed between the first subpixel electrode and a first portion of the roof layer in a first direction,
wherein a second portion of the roof layer is spaced from the first portion of the roof layer in a second direction perpendicular to the first direction,
wherein the second portion of the roof layer is spaced from and disposed over the light blocking member in the first direction, and
wherein the second portion of the roof layer is disposed over the first subpixel electrode without being disposed over the first liquid crystal layer in the first direction.

20. The method of claim 19, comprising:
providing a wall member, which is formed of the organic material and is directly connected to the second portion of the roof member,
wherein a through hole is disposed between a portion of the common electrode and a portion of the wall member in a direction parallel to the substrate.

* * * * *